United States Patent
Guerra et al.

(10) Patent No.: US 10,570,896 B1
(45) Date of Patent: Feb. 25, 2020

(54) PACKING NUT LOCK

(71) Applicants: Jesse Guerra, Alice, TX (US); Richard Anthony Townsend, Midland, TX (US)

(72) Inventors: Jesse Guerra, Alice, TX (US); Richard Anthony Townsend, Midland, TX (US)

(73) Assignee: VP Sales and Company LP, Alice, TX (US)

( * ) Notice: Subject to any disclaimer, the term of this patent is extended or adjusted under 35 U.S.C. 154(b) by 0 days.

(21) Appl. No.: 15/966,181

(22) Filed: Apr. 30, 2018

Related U.S. Application Data (60) Provisional application No. 62/491,686, filed on Apr. 28, 2017.

(51) Int. Cl.
| | |
|---|---|
| *F16B 35/00* | (2006.01) |
| *F04B 53/16* | (2006.01) |
| *F16L 21/08* | (2006.01) |
| *F16L 21/06* | (2006.01) |
| *F16B 39/28* | (2006.01) |
| *F16L 37/084* | (2006.01) |

(52) U.S. Cl.
CPC ............ *F04B 53/16* (2013.01); *F16L 21/065* (2013.01); *F16L 21/08* (2013.01); *F16B 39/28* (2013.01); *F16L 37/0845* (2013.01)

(58) Field of Classification Search
USPC .......................................................... 411/393
See application file for complete search history.

(56) References Cited

U.S. PATENT DOCUMENTS

| | | | | |
|---|---|---|---|---|
| 99,315 | A * | 2/1870 | Heermanee | |
| 508,402 | A * | 11/1893 | Brown | |
| 784,014 | A * | 2/1905 | Steel | |
| 791,051 | A * | 5/1905 | Steel | |
| 972,702 | A | 10/1910 | Maloy | |
| 1,111,732 | A * | 9/1914 | Breault | F16B 39/04 411/295 |
| 1,130,810 | A * | 3/1915 | Goff | F16B 39/04 292/350 |
| 1,289,167 | A * | 12/1918 | Hatten | F16B 39/04 411/295 |
| 1,340,602 | A * | 5/1920 | Evans | F16B 39/04 411/191 |
| 1,426,628 | A * | 8/1922 | Denison | B62D 1/16 403/286 |
| 2,522,235 | A * | 9/1950 | Moore | H02G 3/0683 285/154.4 |
| 3,039,161 | A * | 6/1962 | Gagnon | F16B 2/065 24/490 |
| 3,777,627 | A * | 12/1973 | Goade | F16J 10/02 92/168 |
| 4,410,922 | A * | 10/1983 | Babow | G11B 5/56 360/291.2 |

(Continued)

*Primary Examiner* — Gary W Estremsky
(74) *Attorney, Agent, or Firm* — M. Susan Spiering; Ferrells, PLLC (57) ABSTRACT

Disclosed herein is a packing nut lock for a fluid end assembly of a reciprocating pump. The fluid end assembly includes a fluid end block component, a set screw which may have a pointed end, and a packing nut. The set screw engages or interlocks between the a first and second thread of a threaded bore to prevent displacement of the packing nut from the threaded bore.

10 Claims, 7 Drawing Sheets

(56) References Cited

U.S. PATENT DOCUMENTS

| | | | |
|---|---|---|---|
| 4,455,040 A | | 6/1984 | Shinn |
| 4,919,459 A | | 4/1990 | Miller |
| 5,255,827 A | * | 10/1993 | Breault .................. B05B 1/306 <br> 222/309 |
| 2006/0093458 A1 | * | 5/2006 | Tanaka .................... F16B 9/026 <br> 411/259 |
| 2009/0087280 A1 | * | 4/2009 | Harnetiaux ........... F16B 35/005 <br> 411/436 |
| 2010/0090409 A1 | * | 4/2010 | Sridhar ................... F16J 15/18 <br> 277/308 |
| 2010/0143163 A1 | * | 6/2010 | Patel ....................... F04B 53/16 <br> 417/313 |
| 2011/0296982 A1 | * | 12/2011 | Dille ..................... F16B 39/103 <br> 92/165 PR |
| 2012/0266446 A1 | * | 10/2012 | Leibfried ............... A47K 13/26 <br> 29/525.02 |
| 2013/0264842 A1 | * | 10/2013 | Wagner ................. B62D 65/02 <br> 296/203.01 |
| 2013/0319220 A1 | * | 12/2013 | Luharuka .............. F04B 53/164 <br> 92/165 R |
| 2017/0114879 A1 | * | 4/2017 | Cedrone ................. F04B 13/00 |

* cited by examiner

PACKING NUT LOCK

CROSS REFERENCE TO RELATED APPLICATION(S)

This is a non-provisional patent application based on U.S. Provisional Patent Application Ser. No. 62/491,686 previously titled "Packing Nut Lock", filed on Apr. 28, 2017, the priority of which is hereby claimed and the disclosure of which is incorporated herein by reference in its entirety. This application is filed under a Request For Prioritized Examination Under 37 CFR 1.102(e).

BACKGROUND

Field of the Invention

The present invention relates to a reciprocating pump. More particularly the present invention relates to a packing assembly of the reciprocating pump.

Description of the Related Art

A reciprocating pump is a positive-displacement pump that typically utilizes a crankshaft mechanism for pumping fluid at high pressures. Examples of the reciprocating pump include piston pumps, plunger pumps, and diaphragm pumps. The reciprocating pump is used to pump fluid into a chamber that stores the fluid. A plunger pump includes a plunger that performs a reciprocating motion for creating volume changes that result in flow of fluid in to and out of the chamber.

When the plunger retracts, the fluid flows into the chamber. When the plunger relaxes, the fluid is forced out of the chamber. The reciprocating pump typically includes multiple threaded bores. Generally, a packing assembly is attached to a threaded bore of the multiple threaded bores for sealing the multiple threaded bores. The threaded bore and the packing assembly facilitate the reciprocating motion of the plunger. The packing assembly maintains the pressure in the reciprocating pump and prevents the leakage of the fluid through the threaded bore of the reciprocating pump. The packing assembly typically includes a packing nut that has external threads. The packing nut is rotatably received in the threaded bore and holds the packing assembly firmly to the reciprocating pump. The packing nut includes apertures on the periphery of the outer diameter of the rim. The apertures are typically used for tightening of the packing nut with the help of a spanner or other devices.

Continuous reciprocating movement and high pressure inside the reciprocating pump causes the packing assembly to undergo a substantial amount of vibration. The vibrations generally loosen up the packing nut threaded into the threaded bore. If the packing nut becomes too loose, the high pressure fluid may be ejected from the reciprocating pump at a high velocity and may cause damage to the reciprocating pump. Such damage includes for example causing a washboard effect within the bore, making the pump inefficient at best or unusable at worst. Further, as the nut loosens from vibrations, the reciprocating pump has to be switched-off to tighten the packing nut, further affecting the efficiency of the reciprocating pump. Additionally, vibrations tend to cause a washboard effect within the bore and weaken the pump's efficiency further.

As a partial solution to the above mentioned drawback, U.S. Pat. No. 8,402,880 by Patel, et. al., discloses a packing nut lock for a reciprocating pump. The packing nut lock includes a cylindrical pin and two threaded apertures. The cylindrical pin is inserted into an aperture of the packing nut. The two threaded apertures are designed to rotatably receive a threaded set screw each. The cylindrical pin is machined to fit into the aperture formed on the packing nut. The set screws are tightened to a suitable force against the reciprocating pump frame. The set screws lock the packing nut to the reciprocating pump through a frictional arrangement. Thus, the set screws prevent the packing nut lock from rotating relative to the reciprocating pump frame. A major drawback of the packing nut lock is that the pressure applied by the set screws to keep the packing nut from loosening may be insufficient to keep the packing nut in place for a long period of time. Hence, the set screws may need tightening at regular intervals to prevent the high pressure fluid from leaking out of the reciprocating pump, increasing human labor. Further, the process of fixing each packing nut lock requires tightening of the two set screws, and is hence time consuming. The frictional arrangement requires large amount of lubricant to avoid damage to the packing nut. Further, the frictional engagement of packing nut locks is not sufficient to prevent the loosening of the packing nut from the reciprocating pump.

U.S. Pat. No. 4,919,459 by Miller discloses a lockdown screw including a gland nut metal-to-metal backseat seal. The lockdown screw is received by a threaded bore of a reciprocating pump, and prevents the leakage of high pressure fluid from the threaded bore. The metal-to-metal backseat acts as an additional preventive measure to prevent the high-pressure fluid from leaking out of the threaded bore. However, the lockdown screw is subject to a high amount of vibrations, and may loosen during the functioning of the reciprocating pump. To tighten the lockdown screw, the reciprocating pump has to be turned off, and the gland nut has to be tightened. This causes a drop in the efficiency of the reciprocating pump, and may further lead to a leakage of the high pressure fluid from the threaded bore.

U.S. Pat. No. 4,455,040 by Shinn discloses a sealing assembly including tubing head and a tubing hanger. The tubing hanger includes a support ring and a mandrel shoulder. A metal seal ring is inserted between the support ring and the mandrel shoulder for providing sealing against high pressures. If the sealing assembly is employed in a reciprocating pump, the vibrations of the reciprocating pump may loosen up the metal seal ring, further causing ejection of high pressure fluid from the reciprocating pump. Further, the sealing assembly includes components that are minute in size, and may need attending to upon loosening of the sealing assembly.

U.S. Pat. No. 972,702 by Maloy discloses a nut lock for locking the packing nuts of a pump. The nut lock includes a locking member having a vertical branch, two horizontal arms, and a handle. The packing nut includes a grooved nut and a reciprocating rod. The two horizontal arms are received into the grooved nut. The horizontal arms prevent the grooved nut from rotating and further facilitate the reciprocating motion of the reciprocating rod. The nut lock does not prevent pressure leakage due to vibration of the pump. Further, when the nut lock is loosened, the pump has to be switched off for adjusting the nut lock thereby affecting the efficiency of the pump.

US 2010/0143163 by Patel et al. discloses a packing nut lock and access bore cover locking assembly wherein a retaining system for securing a closure at an installed position within a bore is disclosed.

US 2011/0296982 by Dille et al. discloses a packing nut lock and method of use wherein a retaining apparatus for preventing a threaded nut from unscrewing from a threaded bore of a device is disclosed.

In spite of disclosures for the problem of securing a packing nut within a reciprocating pump, the problem persists of the nut loosening during use. Blunt tip screws are not solving the problem and tend to damage the threads within the bore of the fluid end assembly.

In light of the foregoing discussion, there exists a need for a packing nut lock that not only enhances safety but also is easy to install, remains tight during use, enhances efficiency of the reciprocating pump, and functions with less amount of lubricant.

SUMMARY

An object of the present invention is to provide a secure packing nut lock for a fluid end assembly of a reciprocating pump. The fluid end assembly includes a fluid end block component and a packing nut with a set screw engaged with the threaded bore. The packing nut with the set screw is in engagement with a threaded bore in the fluid end block component. The packing nut includes a flange and a shoulder. The shoulder of the packing nut includes external threads and is positioned within the threaded bore of the reciprocating pump. The flange has apertures that allow a spanner to tighten the packing nut into the threaded bore. The shoulder is externally threaded and is rotatably received by the threaded bore. The set screw is received by a mating hole in the fluid end block component. A tip of the set screw and the externally threaded shoulder interlock together and prevent the loosening of the packing nut from the fluid end block component. The tip may be a sharp end point or other shape provided engagement is occurring with the threaded bore.

The inventive fluid end assembly is easy to install and manufacture. Further, the set screw enhances the safety and efficiency of the reciprocating pump. The set screw can be designed and fitted on any standard reciprocating pump without any structural modifications, keeping the costs low. The packing nut lock assembly is easily attachable to different types of reciprocating pump. The inventive assembly can be retrofitted to existing fluid end assemblies, or built in to a newly manufactured unit.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes a packing nut lock assembly used for achieving enhanced safety conditions to operate a reciprocating pump. Accordingly, the components and the method steps have been represented, showing only specific details that are pertinent for an understanding of the present.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a packing assembly that includes a packing nut and a set screw that enhances the safety while operating a reciprocating pump. Disclosed herein is a fluid end assembly of a reciprocating pump, comprising: a fluid end block component including at least one threaded bore and at least one mating hole; a predominately or substantially pointed end set screw, although other shapes are acceptable provided an engagement occurs with the threaded bore, received by the at least one mating hole, wherein a bottom portion of the set screw includes a first threaded section for fixing the set screw in the at least one mating hole; and a packing nut including a shoulder and a flange, wherein the shoulder includes a second threaded section and is rotatably received by the at least one threaded bore, wherein the flange includes at least one aperture for interacting with a fastening device, and wherein a tip of the set screw interlocks between first and second threads of the second threaded section to prevent displacement of the packing nut from the at least one threaded bore. The interlocks are on an angled portion of a thread, a groove or a part face creating an axial and radial force. The set screw is designed to match and interlock between the first and second thread to at least a 90% degree of fit. While disclosed herein is a sharp point it is understood that the point of the set screw may be predominantly pointed with a sharp point, flat or curved end to match the interlocks of the threaded bore. The second threaded section of the fluid end assembly includes at least one of buttress, ACME, unified, and fine threads. The fastening device is received by the at least one aperture, and facilitates a movement of the packing nut to at least one of lock and unlock into the at least one threaded bore. The packing nut is made of at least one of steel alloy, nickel and titanium.

The invention is described and illustrated relative to a pointed end tip between first and second threads, however it is understood that the threads are described for ease in explanation. There is no particular thread position to insert the point of the set screw provided that the screw is between two threads. The screw is to be set to at least a 90% of fit between the threads, preferably a 95-100% of fit between the threads. Also, any size or design of thread may be used herein. Such as dentate (in which case a flat end screw is used or saw tooth).

Figure 1:
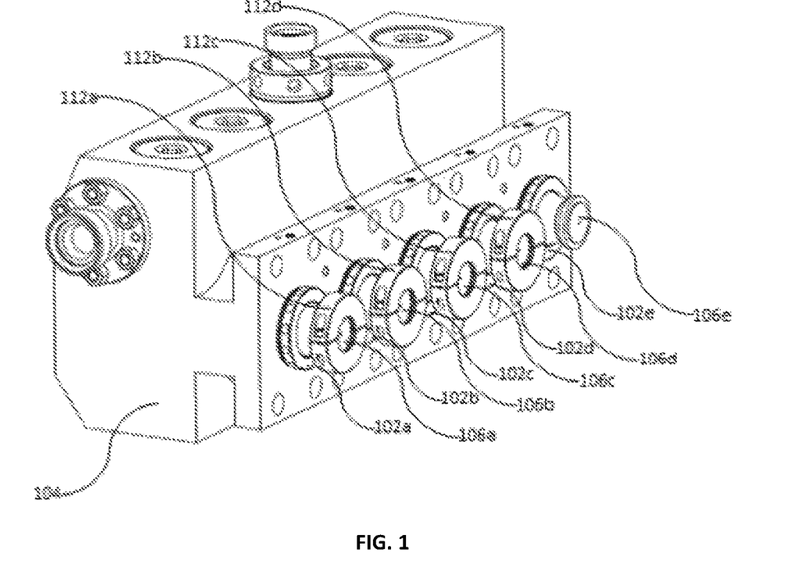
FIG. 1 shows a perspective view of a fluid end assembly of a reciprocating pump.
Figure 2:
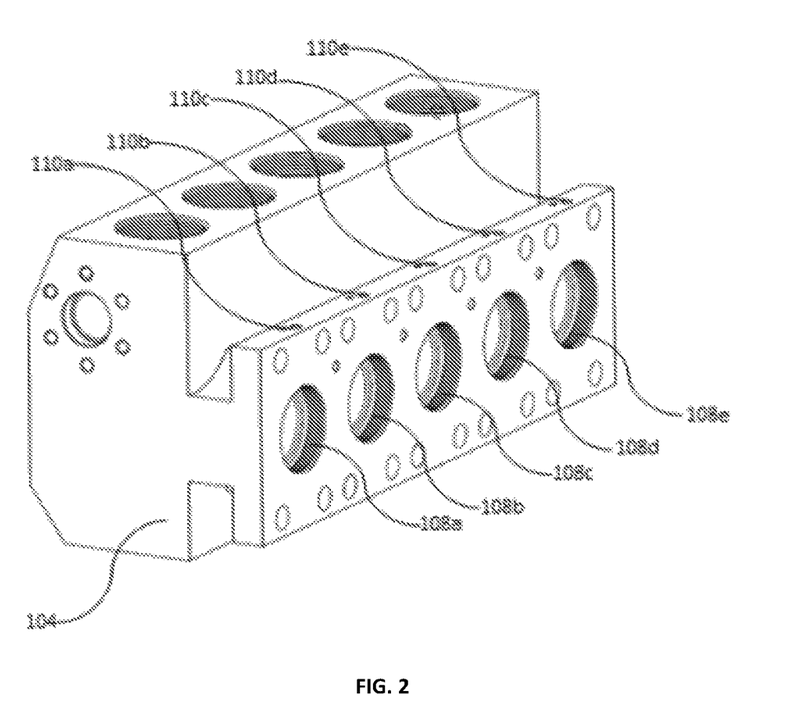
FIG. 2 shows a perspective view of a fluid end block component of the fluid end assembly of the reciprocating pump of FIG. 1.

FIG. 1 illustrates a fluid end assembly 100 of a reciprocating pump. The fluid end assembly 100 includes first through fifth packing nuts 102a-102e (hereinafter referred to as "packing nuts 102"), a fluid end block component 104 and first through fifth plungers 106a-106e (hereinafter referred to as "plungers 106"). FIG. 2 illustrates the fluid end block component 104 of the fluid end assembly 100. The fluid end block component 104 includes first through fifth threaded bores 108a-108e and first through fifth mating holes 110a-110e. The first through fifth threaded bores 108a-108e are threaded for rotatably receiving the first through fifth packing nuts 102a-102e, respectively. The first through fifth plungers 106a-106e perform a reciprocating linear motion by way of the first through fifth packing nuts 102a-102e. The reciprocating motion of the first through fifth plungers 106a-106e creates volume changes in the fluid, and pressure changes, in the fluid end block component 104, as well as pressure changes. The volume changes in the fluid end block component result in fluid flowing in and out the fluid end block component 104 to a chamber (not shown). The fluid end assembly 100 further includes first through fourth plunger clamps 112a-112d covering the first through fourth plungers 106a-106d, respectively. For clarity, the packing is behind the packing nut, inside the block, and not visible. The first through fourth plunger clamps 112a-112d are stationary and are attached to the respective packing nuts 102a-102d. The plunger clamps 112a-112d facilitate the reciprocating movement of the plungers 106a-106d through the threaded bores 108a-108d. The fluid end block 104 is made of 15-5 pH stainless steel. However, other materials such as C-4330 modified steel, 15-5 split stainless steel, and 17-4 PH stainless steel may or the like also be used for fabricating the fluid end block component 104.

Figure 3:
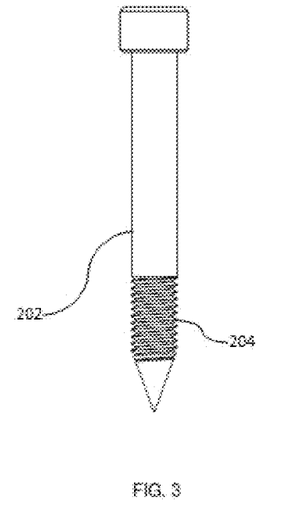
FIG. 3 shows a plan view of a set screw of the fluid end assembly of the reciprocating pump of FIG. 1.

FIG. 3 illustrates a set screw 202 which is received by one of the first through fifth mating holes 110a-110e. In one embodiment, the set screw 202 is in contact with the first packing nut 102a and holds the first packing nut 102a in place, preventing the leaking of the high pressure fluid from the reciprocating pump. The set screw 202 further includes a first threaded section 204 and is received by the first mating hole 110a. The first threaded section 204 prevents the loosening of the set screw 202 from the first mating hole 110a. The first threaded section 204 may be threaded using threads such as UTS threads, ACME threads, buttress threads and the like. Threading the first threaded section 204 with fine threads provides a better locking of the set screw 202 in the first through fifth or respective mating holes 110a-110e. However, the first threaded section 204 may be threaded with other types of threads depending on the operating pressure and the size of the reciprocating pump and the type of metal used for fabricating the fluid end block component 104. Lock screw 202 may be made of a multitude of materials and sizes, however it must be able generate sufficient radial and axial force on the packing nut to lock it in place. The amount of clamping or locking force a fastener can provide is a function of material strength, hardness, and friction coefficient, length of thread engagement etc. A larger pump that experiences greater vibration may require a greater length of thread engagement, a stronger material, a different thread type, or a larger diameter. The angle and point of set screw 202 must also be matched to the thread type on packing nut 102 such that it will generate the forces required to lock it into place.

Figure 4:
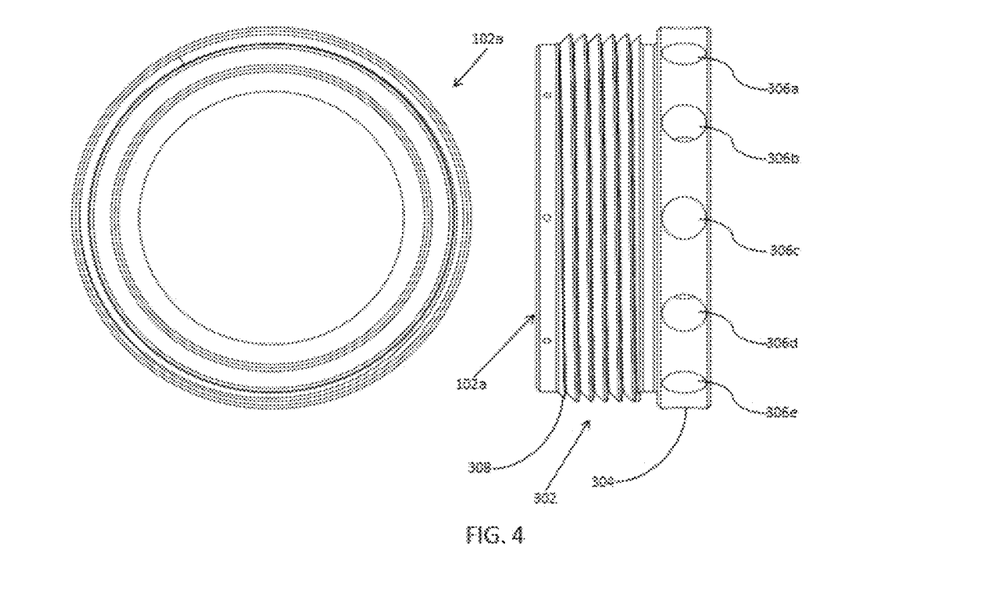
FIG. 4 shows front and side elevational views of the packing nut with buttress threads of the fluid end assembly of the reciprocating pump of FIG. 1.
Figure 5:
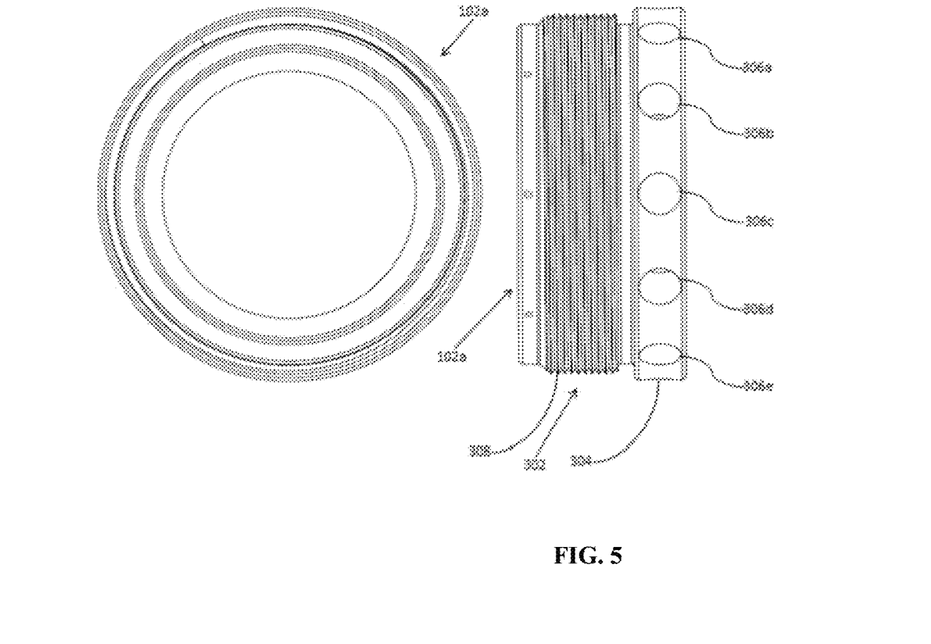
FIG. 5 shows front and side elevational views of the packing nut with fine threads of the fluid end assembly of the reciprocating pump of FIG. 1.

As illustrated in FIGS. 4 and 5, front and side elevational views of each of the first through fifth the packing nuts 102a-102e are shown. In one embodiment, the first packing nut 102a includes an annular bore that allows a plunger to reciprocate smoothly through the first threaded bore 108a. The first packing nut 102a includes a shoulder 302 and a flange 304. In an embodiment, the flange 304 is of circular or round shape. However, any other suitable shape such as hexagonal may also be used. The flange 304 includes a plurality of apertures 306a-306e (hereinafter referred to as "apertures 306") that are spaced equidistantly. The five apertures 306 are shown for illustrative purposes only and any suitable number of apertures 306 may be included without departing from scope and spirit of the present invention. The apertures 306 of the first packing nut 102a extend from an outer surface to an inner surface of the first packing nut 102a. The apertures 306 allow a spanner and other devices of the like to engage with the first packing nut 102a. The engaged spanner and other devices of the like are used to tighten and loosen the first packing nut 102a. It is understood that the flange 304 may be right or left handed without departing from scope of this invention.

An external surface of the shoulder 302 of the first packing nut 102a includes a second threaded section 308. As illustrated in FIG. 4, the second threaded section 308 is threaded with buttress threads. As illustrated in FIG. 5, the second threaded section 308 is threaded with fine threads. However, the second threaded section 308 may be threaded with any other type of threads depending on the requirement or needs of the user. The first packing nut 102a is rotatably received in the first threaded bore 108. The first packing nut 102a acts as a support structure for a packing surrounding the first plunger 106a. The first packing nut 102a holds the packing in the proper position within the fluid end assembly 100. The packing along with the first packing nut 102a maintains the necessary pressure between the first plunger 106a and the fluid end assembly 100 and prevents leaking of the high pressure fluid from the reciprocating pump. In an embodiment, the first packing nut 102a is made of steel alloy. However, any other suitable material, such as nickel or titanium or the like may also be used. In another embodiment, the first packing nut 102a is coated with nitride to enhance the life of the first packing nut 102a.

Figure 2B:
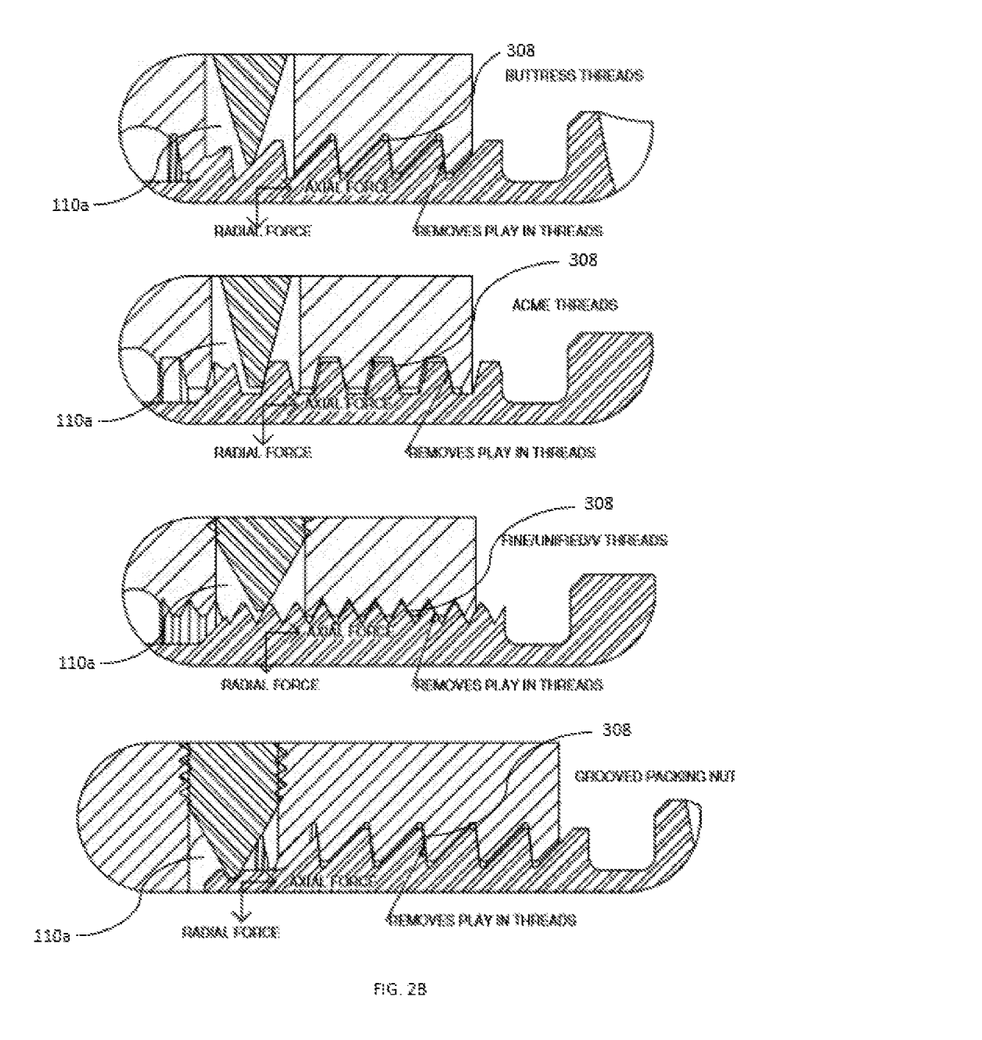
FIG. 2b shows a sectional side view of the set screw with buttress, ACME, fine and unified threads of the fluid end assembly of FIG. 1.
Figure 6:
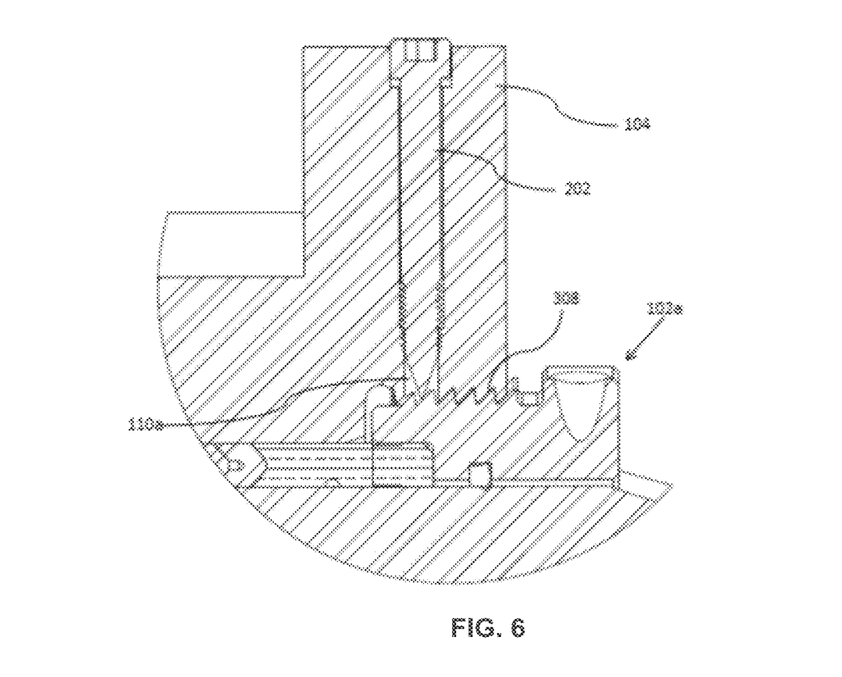
FIG. 6 shows a side sectional view of the set screw and the packing nut with buttress threads of the fluid end assembly of the reciprocating pump of FIG. 1.
Figure 7:
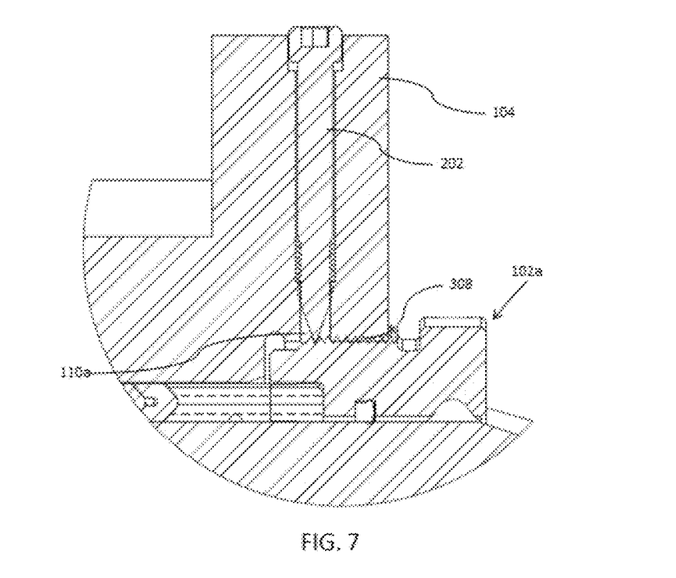
FIG. 7 shows a side sectional view of the set screw and the packing nut with fine threads of the fluid end assembly of the reciprocating pump of FIG. 1.
Figure 8:
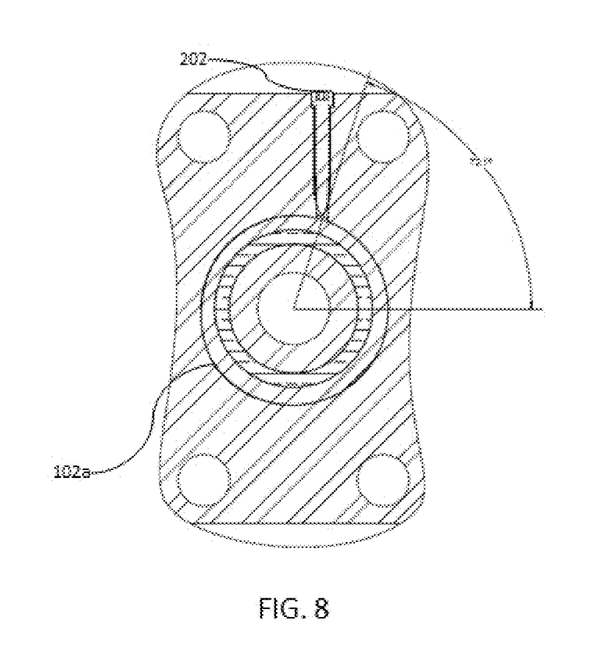
FIG. 8 shows a front sectional view of the set screw and the packing nut of the fluid end assembly of the reciprocating pump of FIG. 1.
Figure 11:
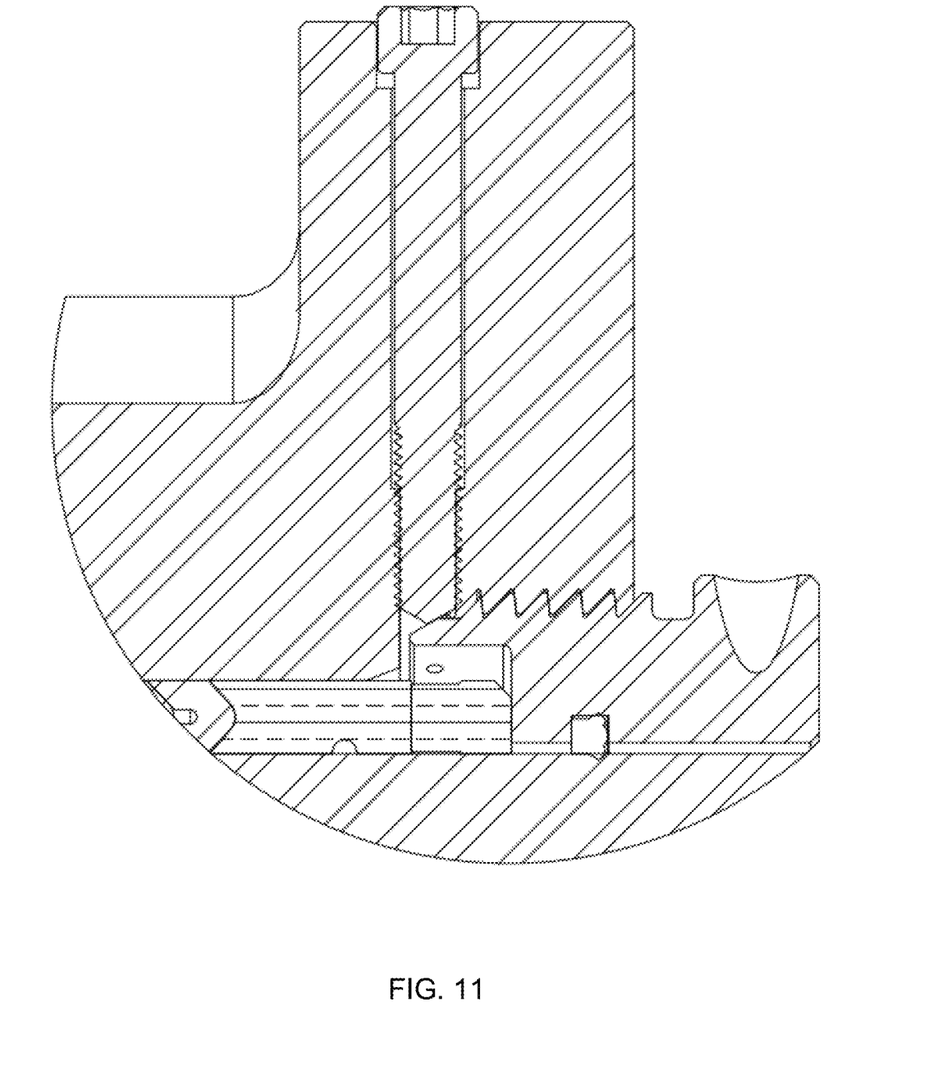

FIGS. 6, 7 and 11 illustrate a side sectional view of the first packing nut 102a and the set screw 202. The set screw 202 is received into the first mating hole 110a. FIG. 11 is a variation of FIGS. 6 and 7. The first threaded section 204 fixes the set screw 202 into the first mating hole 110a, and further prevents the loosening of the set screw 202 from the first mating hole 110a during the vibrations caused in the reciprocating pump. A tip of the set screw 202 is interlocked with the second threaded portion 308 of the shoulder 302. The interlocking of the tip of the set screw 202 with the second threaded section 308 prevents linear motion of the first packing nut 102a, keeping the first packing nut 102a firmly fixed in the fluid end block component 104. The angle of the tip of the set screw 202 and the angle between two threads of the second threaded section 308 match each other, such that the tip of the set screw generates radial and axial forces on the second threaded section 308 for keeping the packing nut 102 tightened to the fluid end assembly 100. This angle is made such that the point or conical face will rest on the angled flank of the thread on packing nut 102. Hence, the tip of the set screw 202 locks perfectly between two threads of the second threaded section 308. The angle of the tip of the set screw 202 is such that the tip of the set screw 202 does not damage the second threaded section 308 of the first packing nut 102a even after long operating periods of the reciprocating pump. The second threaded section 308 of FIG. 7 is threaded with buttress threads. The second threaded section 308 of FIG. 8 is threaded with fine threads. The interlocking of the set screw 202 with the two threads of the second threaded section 308 prevents the rotation and the pushing out of the first packing nut 102 from the first threaded bore 108a in spite of the vibrations in the reciprocating pump. FIG. 2B further illustrates the second threaded section 308 manufactured with buttress, ACME, fine and unified threads. The tip of the set screw 202 is designed to perfectly fit in between two threads of the second threaded section 308. FIG. 8 further illustrates axial and radial forces that keep the set screw 202 tightly locked to the packing nut 102. It has been found that without matching the tip of the screw to the threads, appropriate forces are not met to maintain the tightness, or avoid the loosening, of the set screw and hence loosening of the packing nut.

Figure 9:
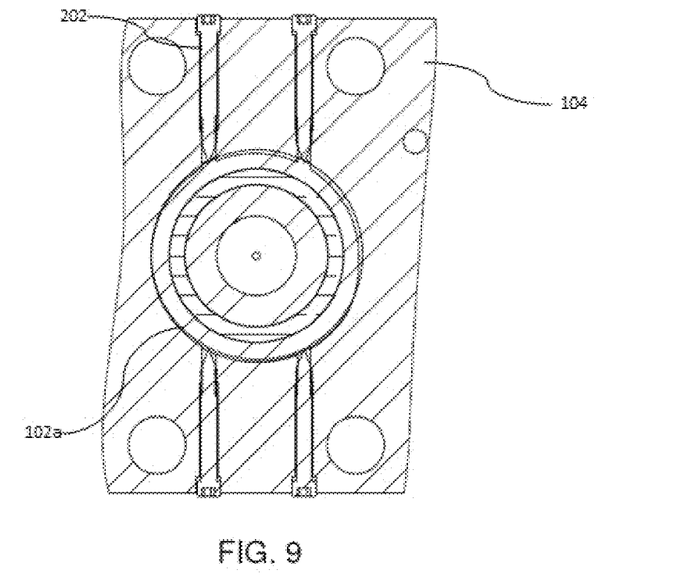
FIG. 9 shows a front sectional view of the set screw and the packing nut of the fluid end assembly of FIG. 1 illustrating alternate positions of set screws.
Figure 10:
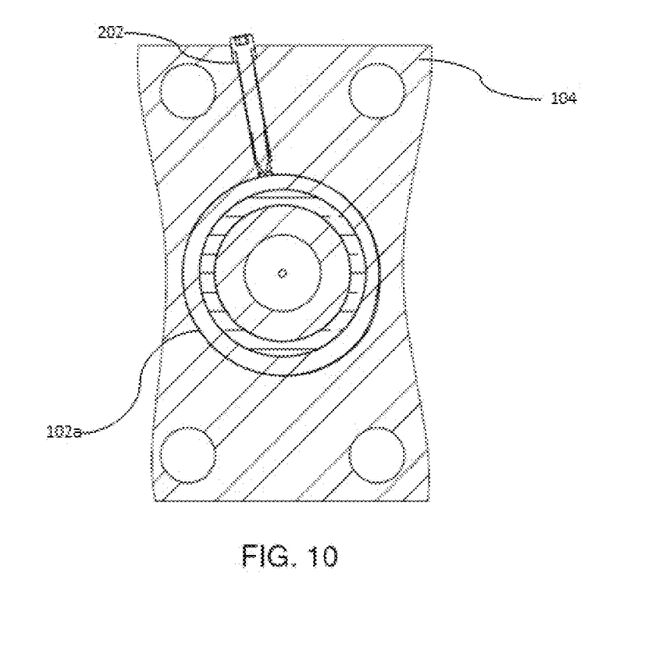
FIG. 10 shows a front sectional view of the set screw and the packing nut of the fluid end assembly of the reciprocating pump of FIG. 1 illustrating an alternate angle of the set screw; and, FIG. 11 shows an alternate embodiment of the invention.

FIGS. 8, 9, and 10 illustrate various positions and angles of the first mating hole 110a into which the set screw 202 is inserted. As illustrated by FIG. 8, the tip of the set screw 202 is at an angle of about 72 degrees with a horizontal axis. The angle may be within the range shown in FIG. 8, and this quadrant setting may be in either of the four quadrants; or alternatively, the screw may be placed wherever most convenient for the user provided a solid contact is made between the tip of the set screw 202 and the interlocking mechanism of the first packing nut 102a. The set screw 202 may also be designed to interlock with the shoulder 308 at either a 2 o'clock position, a 5 o'clock, a 7 o'clock position or a 10 o'clock position. The set screw 202 may also be designed to interlock with the shoulder 308 at any angle ranging from 0 to 360 degrees. It has been found that the 2 o'clock position provides maximum interlocking between the set screw 202 and the shoulder 308 as the set screw 202 achieves maximum interlocking during the pulsation of the reciprocating pump. The angle between the tip of the set screw 202 may be changed based on an operating pressure of the reciprocating pump and the reciprocating pump safety requirements.

The angle of the tip of the set screw is machined to provide maximum interlocking between the set screw 202 and the second threaded section 308. FIG. 9 illustrates multiple set screws for fixing the first packing nut 102a firmly to the fluid block component. When the reciprocating pump functions at higher pressures, the multiple set screws prevent the loosening of the first packing nut 102a from the first threaded bore 108a and further prevent the discharge of high pressure fluid from the first threaded bore 108a. FIG. 10 illustrates an alternate angle between the set screw 202 and the horizontal axis.

The packing nuts 102 and the set screw 202 eliminate the loosening of the packing nuts 102 from the threaded bores 108. This maintains necessary pressure of fluid between the plungers 106 and the threaded bores 108. Further, the set screw 202 prevents leakage of the high pressure fluid from the threaded bores 108 due to reciprocating movement of the plungers 106 and vibrations of the fluid end assembly 100. The set screw 202 enhances the safety of the reciprocating pump and the pump operators operating the reciprocating pump by preventing a high velocity discharge of high pressure fluid and the plungers 106 from the fluid end assembly 100. A packing nut in a typical reciprocating pump needs readjusting after about every two hours of operation. The fluid end assembly 100 has a longer operating span and does not require the pump operators to tighten the set screw 202 as frequently, thereby increasing the operating time of the reciprocating pump to at least two hundred and fifty hours, reducing the effort put in by the pump operators. The longer operating span facilitates a higher efficiency of the reciprocating pump.

EXAMPLE

The inventive packing assembly was installed on a fluid end block having a 4 inch QWS 2500 standard 20 QUINTIPLEX pump as sold by VP Sales and Company in Alice, Tex. This packing assembly can be applied to all reciprocating pumps and sizes in the range of about 2.75 inches to about 6 inches. Presently the packing assembly is interchangeable between a QWS (5 hole) and a TWS (3 hole) system. The present packing nut lock concept disclosed is applicable to any size or model of plunger pump having about 150-250 rpm, and a pressure of up to about 15,000 psi.

A user should not see drastic pressure differential because the lock is intended to keep the packing adjusted correctly as the pressure readjusts to the working conditions of the pump in the field. The objective of the invention is to maintain packing adjustment per manufacturer specification and keep the pump in optimal operation.

The temperature is expected to fluctuate based on the friction created as liquid is pumped up from about 250° F. to about 500° F. The lubrication or grease within the pump and the packing assembly as a whole will withstand typical heat conditions while the nut lock is in place.

The packing within the pump is based on manufacturer recommendations and is not the subject of this invention. A typical manufacturer of an elastomer end packing is Utex.

The threads of the subject lock can vary and remain functional. FIG. 2B illustrates threading and the threading can cover a 6.75-4 buttress thread, 7.00-4ACME threads or 6.00-8 UNS.

The packing assembly typically is sold to withstand about 500 hours of use; the inventive solution generally keeps the assembly functional for the intended length of use with minimal operator assistance. While a typical pump without a lock assembly requires tightening about every 2-4 hours of use, the present inventive lock has been found to be operational for approximately 250-300 hours without the need for tightening (manual or otherwise). It has been found that the set screw of the packing assembly needs retightening after approximately 250-300 hours of operation.

EXAMPLE

For the sake of this example, efficiency will be defined as uptime divided by runtime.
$E=Tu/Tr$; the time it takes to tighten packing nuts will be defined as 2 minutes.
$Tn=2$ min$=2/60$ hr.
In the case of retightening nuts, every 2 hours with no locks when run time is 250 hours.
$Tr=250$ hr;
$Tn=2/60$ hr;
$Ft=2$;
$Tu=(Tr-(Tr/Ft)*Tn)=245.8333$ hr;
$E=0.9833$
4 hrs and 10 min spent tightening nuts.

COMPARATIVE EXAMPLE

In the case of retigthening nuts every 250 hours with locks when run time is 250.
$Tr=250$ hr; $Tn=2/60$ hr; $Ft=250$; $Tu=(Tr-(Tr/Ft)*Tn)=249.9667$ hr; $E=0.9999$ 2 minutes spent tightening nuts.

What is claimed is:

1. A fluid end assembly of a reciprocating pump, comprising:
    a fluid end block component including at least one threaded bore and at least one mating hole wherein the at least one mating hole intersects with the at least one threaded bore, and wherein an axis of the at least one mating hole is at a predetermined non-zero angle with respect to a radial axis of the at least one threaded bore;
    at least one set screw received by the at least one mating hole, wherein a bottom portion of the at least one set screw includes a tip and a first threaded section for fixing the at least one set screw in the at least one mating hole; and
    a packing nut including a shoulder and a flange, wherein the shoulder includes a second threaded section on an external surface of the shoulder and is rotatably received by the at least one threaded bore, wherein the flange includes at least one aperture for interacting with a fastening device, wherein the tip of the at least one set screw interlocks between first and second threads of the second threaded section, thereby preventing axial displacement of the packing nut from the at least one threaded bore; and wherein the packing nut is adapted to receive reciprocating linear motion of a plunger.

2. The fluid end assembly of claim 1, wherein the second threaded section includes at least one of buttress, ACME, unified, and fine threads.

3. The fluid end assembly of claim 1, wherein the at least one aperture is designed to receive a fastening device that facilitates a movement of the packing nut to at least one of a lock and an unlock position in the at least one threaded bore.

4. The fluid end assembly claim 1, wherein the packing nut is made of at least one of steel alloy, nickel and titanium.

5. The fluid end assembly of claim 1, wherein the tip of the at least one set screw is predominantly pointed having a flat edge to the sides of the point to match the interlocks between the first and second threads.

6. The fluid end assembly of claim 1, wherein the tip of the set screw is one of a flat point, or a curved point which matches and interlocks between the first and second threads.

7. The fluid end assembly of claim 1, wherein the at least one set screw matches and interlocks between the first and second threads to at least a 90% of fit.

8. The fluid end assembly of claim 7, wherein the at least one set screw interlocks with the first and second threads to at least a 95% of fit.

9. The fluid end assembly of claim 1, wherein the tip of the at least one set screw interlocks with the first and second threads at the predetermined angle of about 72 degrees with a horizontal axis.

10. The fluid end assembly of claim 1, wherein the block component is provided with at least two mating holes to receive at least two set screws.

* * * * *